March 1, 1960 I. B. HUMPHREYS 2,926,436
ROTARY CUTTER FOR A DREDGE CUTTING HEAD
Filed Jan. 27, 1955 5 Sheets-Sheet 1

INVENTOR.
IRA B. HUMPHREYS
BY
ATTORNEY

March 1, 1960     I. B. HUMPHREYS     2,926,436
ROTARY CUTTER FOR A DREDGE CUTTING HEAD
Filed Jan. 27, 1955     5 Sheets-Sheet 2

*INVENTOR.*
Ira B. Humphreys
BY
*ATTORNEY*

March 1, 1960  I. B. HUMPHREYS  2,926,436
ROTARY CUTTER FOR A DREDGE CUTTING HEAD
Filed Jan. 27, 1955  5 Sheets-Sheet 3

INVENTOR.
IRA B. HUMPHREYS
BY
ATTORNEY

March 1, 1960

I. B. HUMPHREYS 2,926,436

ROTARY CUTTER FOR A DREDGE CUTTING HEAD

Filed Jan. 27, 1955

INVENTOR.
IRA B. HUMPHREYS
BY
ATTORNEY

United States Patent Office 2,926,436
Patented Mar. 1, 1960

2,926,436

ROTARY CUTTER FOR A DREDGE CUTTING HEAD

Ira B. Humphreys, Denver, Colo., assignor to Humphreys Engineering Company, Denver, Colo., a corporation of Colorado Application January 27, 1955, Serial No. 484,401

7 Claims. (Cl. 37—67)

The present invention relates to a rotary cutter and more particularly and specifically it is concerned with the provision of a new and improved reversible, rotating cutter head of a type to be used in dredging operations.

Certain prior art constructions of dredge cutting heads have embodied the provision of rotating heads provided with splined or spiral type blades thereon, which blades are designed to present a fixed cutting angle in the direction of rotation of the head.

In dredging with cutter heads of prior constructions the heads have usually been supported on the extended end of a ladder which has its second end hinged to the front or forward end of a dredge barge or scow so that the ladder and head can be moved vertically in order to regulate the depth of cut.

The front end of the barge along with the ladder and head have normally been moved from side to side to swing the head in a cutting arc by use of spuds serving to alternately pivot the rearward end of the barge. These spuds also serve to permit relocation and anchoring of the barge progressively relative to the material to be cut.

Most prior cutting head constructions are designed to cut while rotating in one direction of head swing in order to dislodge material to be taken up by suction apparatus. During the opposite or back swing of the cutter head the cutting edges of the blades are oppositely disposed to the direction of swing and the rotation of the blades has been downward into the bank of material to be cut rather than upward as is desired for efficient operation. Thus, the efficiency of the cutting head is greatly reduced during the return swing of the head and ladder during a substantial portion of the over-all dredging operation. In addition, the action of the cutting head on the material to be dislodged in the return swing of the head and ladder is such that the dislodged material is normally moved away from the dredge suction thereby leaving a substantial amount of material which must be taken up by a separate cleanup operation. Still further, the downward movement of the cutting blades on the return swing of the ladder and head produces a tendency in the blades to cause the cutter head to climb or walk on the material to be dislodged rather than efficiently dislodge it as is desired.

Accordingly, the use of prior constructions which include cutting blades having a fixed position has greatly hampered the efficiency and substantially increased the cost of dredging operations.

Therefore, it is a general object of the present invention to provide a dredge cutting head which embodies a unique and advantageous blade construction which permits the head to cut equally well in either direction of swing of the head and ladder relative to the dredge or scow.

Another object of the present invention lies in the provision of a rotating cutting head in which the cutting blades are supported in such a manner as to be freely movable between two fixed, opposite cutting positions, and a head construction wherein the proper positioning of the cutting blades relative to the direction of cut is automatically obtained.

A still further object of the instant invention lies in the provision of a reversible, rotating cutting head which is readily adaptable for installation in both new as well as existing dredge equipment to be supported in a simple and conventional manner on the usual boom or ladder of the dredge mechanism. Further, the cutting head constituting the present invention is of a construction which lends readily to efficient operation conjunctively with the suction apparatus of underwater dredging equipment.

Yet another object of the present invention is to provide a cutting head construction in which the cutting blades are movable between two fixed cutting positions and wherein the proper positioning of the blades relative to the direction of cut is automatically obtained by the resistance of the material to be cut. This automatic positioning initiated by the resistance of the material to be cut operating against one or more of the cutting blades will, by reason of the novel and utilitarian construction of the present cutter head, automatically and substantially simultaneously move all of the cutter blades to identical and proper cutting positions.

A still further object is the provision of a rotating cutter head particularly adaptable to dredging operations which is extremely efficient and durable in use requiring a minimum of maintenance and upkeep over extended periods of time.

These foregoing and other objects and advantages of the present invention will become readily evident to those skilled in the art when the following description is read in the light of the accompanying drawings.

The nature of the present invention may be stated in general terms as including a cutting head supported on and operated by a reversible drive shaft including a hub member rigidly affixed to the drive shaft, a plurality of cutting blades pivotally supported by said hub, said blades being spaced about said hub, stop means associated with each of said blades for limiting pivotal movement thereof in two directions, and indexing means interconnecting said blades to produce substantially simultaneous pivotal movement.

Turning now to the accompanying drawings, in which like numerals designate similar parts throughout the several views.

Figure 1:
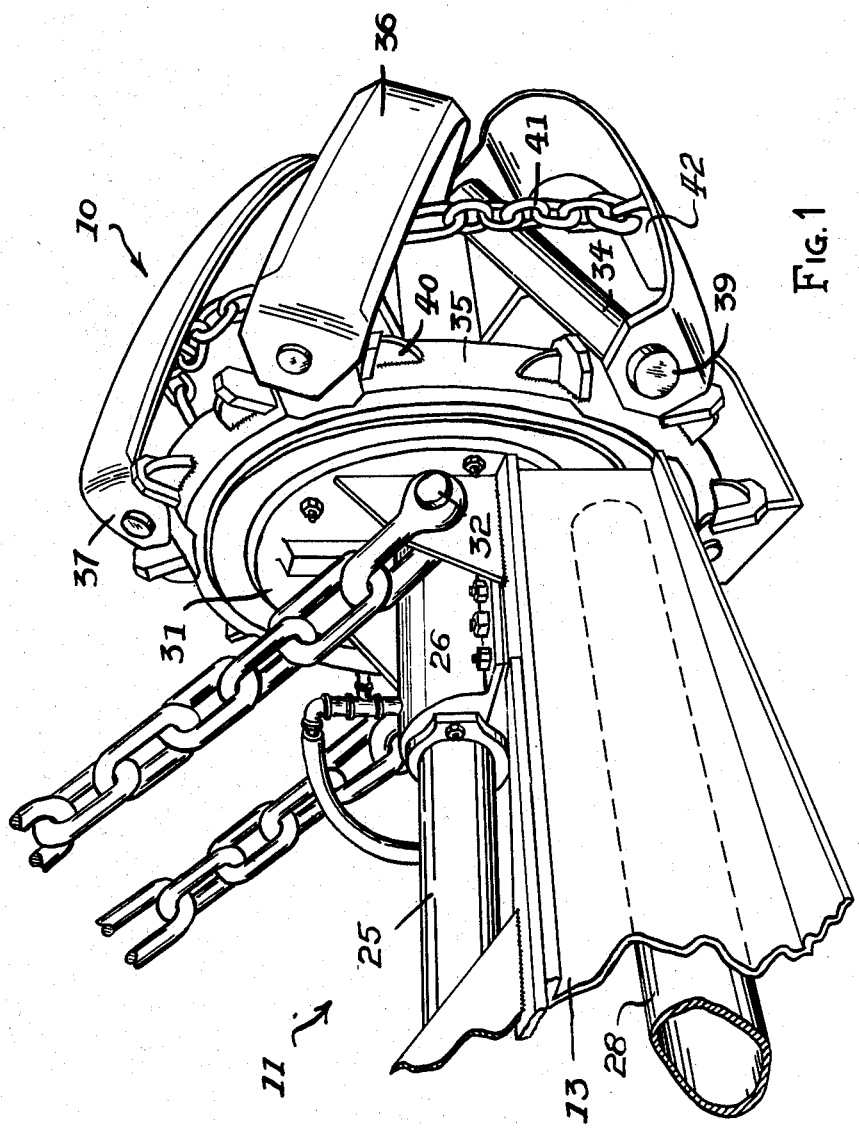
Fig. 1 is a perspective view of the cutter head as associated with fragmentary portions of a dredge apparatus ladder.
Figure 2:
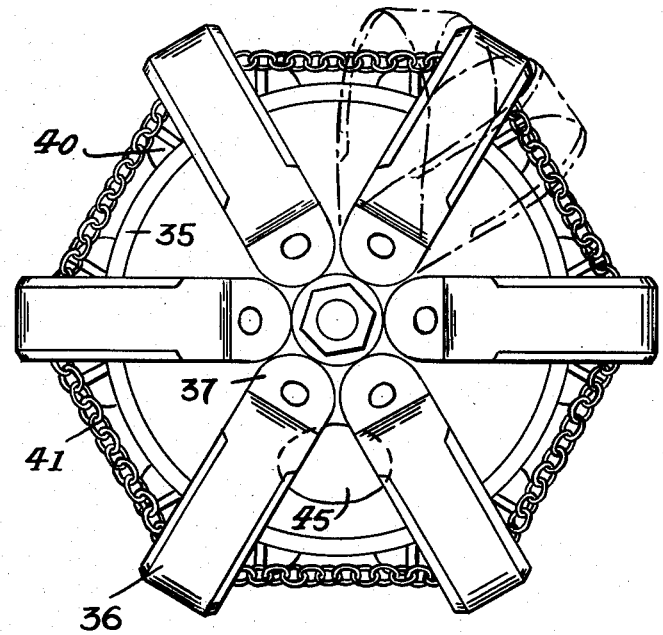
Fig. 2 is a bottom plan view of the cutter head in association with said ladder.
Figure 3:
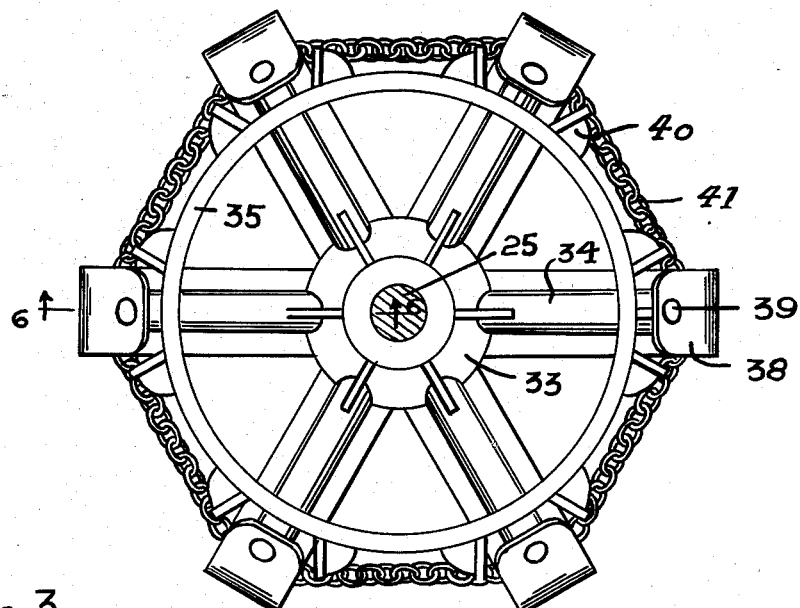
Fig. 3 is a top plan view of said cutter head with the drive shaft shown in section.

Referring now to the accompanying drawings in more specific detail, the numeral 10 generally designates the cutting head constituting the present invention and the numeral 11 generally designates the ladder or boom arrangement from which the cutter head is operatively supported.

With particular reference to Figs. 10 and 11 of the drawings there is shown, for purposes of illustration only, a dredge barge or scow apparatus with which the cutter head constituting the present invention is cooperatively associated.

In these Figs. 10 and 11 the cutter head 10 is carried at one end of a ladder or boom 13, the second end of which is hinged transversely on the forward end of the barge to permit vertical movement of its extended end. The forward end of the barge is provided with a vertical mast 14 and a forwardly angularly extending mast or sprite 15 which extends outwardly over the hinged ladder 13.

A set of cables 16 are secured to the extended end of the ladder adjacent the cutter head and connect through a series of blocks 17 and sheave 18 on the sprite 15 and the mast 14 respectively with a power winch 19 on the barge. This arrangement provides for controlled vertical positioning of the ladder and cutter head.

The rearward end of the barge 12 is alternately pivotally fixed by a pair of spaced spuds 20. A second winch 21 receives cables 22 and 23 which extend through sheaves 24 on the boom or sprite 15 to deadmen located on opposed sides of the barge.

Lateral, swinging movement of the head is obtained by swinging the forward end of the barge alternately about one spud 20 and then the other through winch control of cables 22 and 23.

Associated with the boom or ladder 13 is a drive shaft 25 mounted by suitable spaced bearings 26 along the length of the ladder, and the drive shaft is rotatably driven by means of a reversible motor 27 which is also electrically controlled from a convenient point on board the scow or dredge.

In addition to the shaft 25 a suction line 28 is supported the length of the boom 13 with its suction end located adjacent the extended end of the boom and its opposite or discharge end flexibly coupled through a suitable pump 29 to a discharge line 30 which may be arranged to discharge the dredged material at any desirable point either on the scow or some point remote thereto.

The extended end of the drive shaft 25 is provided with a concentric guard plate 31 which is supported from the boom or ladder 13 to form a circular guard for the end of the ladder concentrically about the shaft. Additionally, as may be seen in Fig. 1, the guard plate 31 together with the boom 13 forms a base to which the vertical movement control cables 16 are swivelly mounted as at 32.

Figure 6:
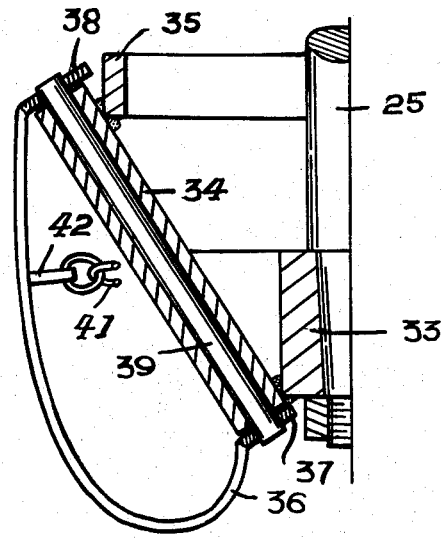
Fig. 6 is a fragmentary section taken on line 6—6 of Fig. 3.

Referring now to Fig. 6 it is seen that the extended end of the shaft 25 is provided with a rigidly secured hub 33 which hub is substantially cylindrical in cross section. The lower end portion of the hub forms a base to which a plurality of tubular posts 34 are secured in equally spaced relationship thereabout, the post 34 extending upwardly from the hub at an angle diverging from the axial center line of the shaft 25. The upper extended ends of the post 34 are rigidly secured to a top ring support member 35 which ring is concentrically positioned relative to the shaft 25.

Associated with each of the tubular posts 34 is an arcuate cutting blade 36 which has a flat turned-over lip portion 37 beneath the foot of the post member 34 and a second turned-over lip portion 38 overlying the upper face of the top of the post 34. A rigid shaft 39 extends through each of the tubular posts 34 to rigidly engage the lip portions 37 of each of the arcuate blades below the posts 34 and the turned-over lip portions 38 of the baldes above the top of the posts. In accordance with the foregoing construction the arcuate cutting blades 36 are thus rigidly secured at each end of the extended ends of the shafts 39 to be supported for pivotal movement about the axis of the shafts 39 and the tubular posts 34 which act as bearing housings for the shafts.

As is best illustrated in Figs. 2 through 5, the top ring member 35 is provided with a plurality of buttress type stop members 40 which are located about the outer circumferential edge of the top ring in oppositely disposed pairs, each pair being associated with one of said blades and defining the extreme limits within which said blades are capable of pivotal movement. The stop members 40 are of such a size and configuration so as to engage the opposed edge portions of the cutting blades 36 adjacent the top ring member 35.

Associated with the cutting blades 36 are a plurality of indexing chains 41, said chains all being of equal length and each chain interconnecting adjacent cutting blades about the cutting head. The indexing chains 41 are secured at each end to mounting brackets 42 which are rigidly secured to the inner faces of the cutting blades 36 at identical positions thereon throughout all the blades of the head.

The normal tension of the indexing chains 41 is such as to cause substantial simultaneous movement in the same direction of all the cutting blades of the head when one of said blades is moved rotatably in one direction concentrically about its supporting tube.

Figure 4:
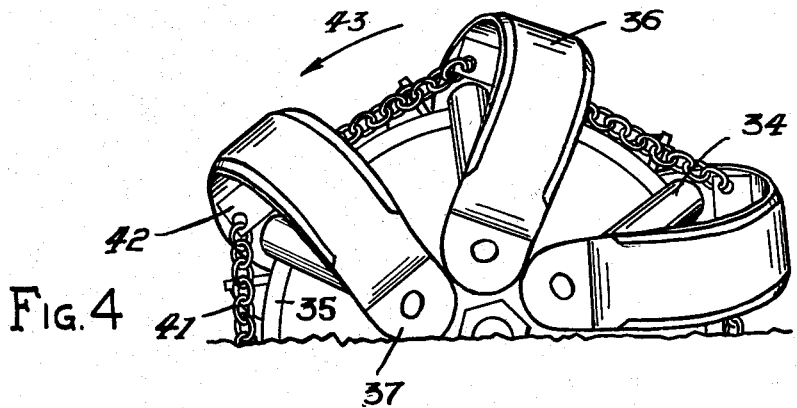
Fig. 4 is a fragmentary bottom plan illustrating the cutter blades in one cutting position.

It is understood that the positioning of the stop members 40 about the top ring 35 is a predetermined calculation so as to permit the cutting blades to present a leading cutting edge to the material to be cut in a position to afford the utmost efficiency in the cutting action of the blades. With reference to Fig. 4, it is seen that for rotation of the cutting head in the direction indicated by the arow 43 the cutting blades, by reason of the resistance offered by the material to be cut, will be simultaneously moved through the medium of the indexing chains 41 to bring the trailing edges of the blades to bear against what would then be the rear stop members 40 so that the forward or leading edge of the cutting blades in the direction of rotation of the head will be such as to produce the maximum cutting efficiency.

Figure 5:
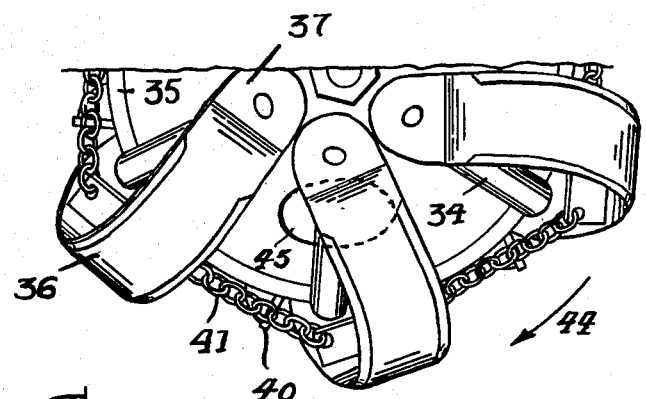
Fig. 5 is a view similar to Fig. 4 with the cutter blades in the opposite cutting position.

With reference to Fig. 5, it can be seen that the reversed rotation of the cutting head in the direction indicated by the arrow 44 would, when one of the blades was moved by the resistance of the cutting material, cause the blades to move to positions opposite to those illustrated in Fig. 4 to present the leading cutting edge in a position substantially identical with those cutting edges provided by the positioning of the cutting blades as illustrated in Fig. 4.

Figure 7:
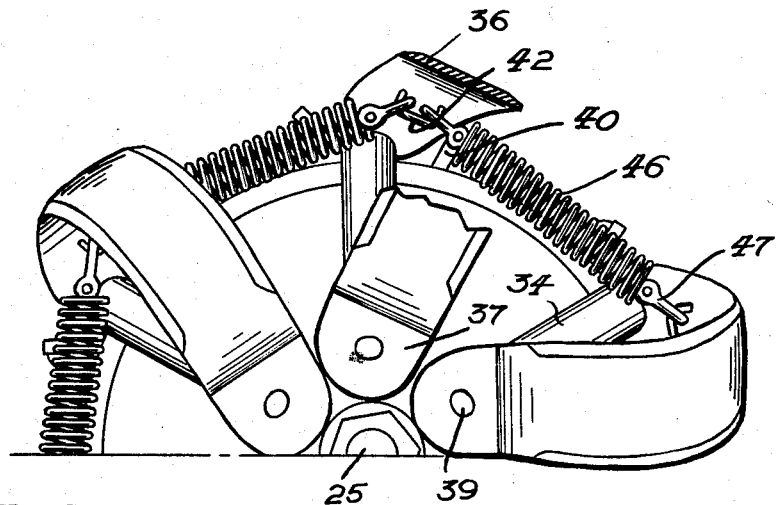
Fig. 7 is a fragmentary bottom plan of a modified embodiment of the cutter head.
Figure 8:
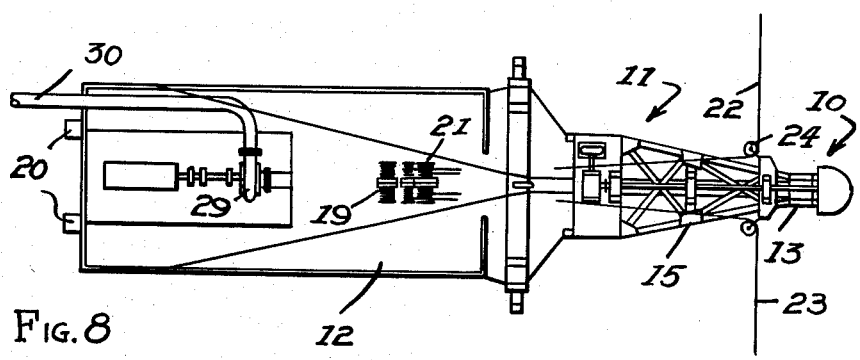
Fig. 8 is a plan view of the cutter head associated with the dredge apparatus.
Figure 9:
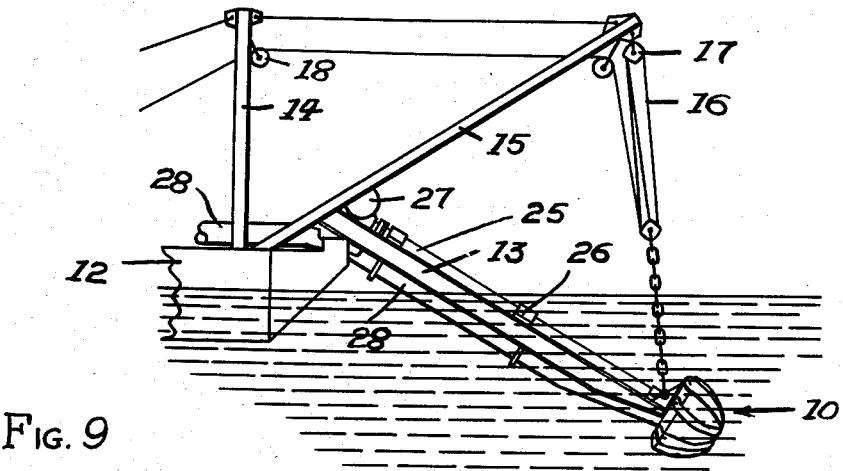
Fig. 9 is a fragmentary side elevation of Fig. 8.

In Fig. 7 of the drawings there is illustrated a modified construction of the cutter head wherein the head is substantially identical in all respects to the preferred embodiment heretofore described with the exception of the indexing chains 41 which, in the present embodiment are replaced by coil springs 46. The coil springs 46 are of a precalculated length and tension and are connected by U bolts 47 at each end thereof to the mounting brackets 42 on the inner face of each of the cutting blades 36.

The springs 46 in this modified construction are under a predetermined tension which acts in a plane at right angles to the drive shaft 25 of the cutting head thereby setting up a precalculated, hexagonal diagram of forces about the cutting head. These forces established by the springs 46 are such that the springs will hold the blades against the stops 40 in one direction around the head until such time as rotation of the cutting head is reversed whereupon the force produced by the opposition of the material engaged by the cutting blade is placed in opposition to the force of the spring whereupon each cutting blade will pivot into abutment with the opposite stop as each blade engages the material to be cut. In this manner each blade is brought to a location where it presents the proper and most efficient cutting edge position relative to the material to be cut and in which location it is held by the force of the springs until direction of rotation of the head is again reversed.

In accordance with the construction of the cutting head described in the foregoing it can now be readily seen that a dredge cutting head has been provided which will cut in all lateral and vertical directions of movement of the head with maximum efficiency in any direction by virtue of the automatic positioning of the movable cutting blades. It is also evident that for underwater dredging operations the construction of the present cutting head will provide an efficient cutting operation to permit the materials to be cut, together with the surrounding water to be drawn upwardly into the suction line 28 through a suction nozzle or opening 45 (Fig. 2) which opens through the support plate 31 adjacent the top ring 35 of the cutter head.

It is additionally evident that a construction has been provided which satisfies all of the objects and advantages heretofore attributed to the present invention and which is capable of numerous modifications and arrangements without departing from the scope of the present invention as it is defined and limited by the hereinafter appended claims.

What is claimed is as follows:

1. In a hydraulic dredging apparatus, a cutting head and means for supporting and selectively rotating the head in either direction, said head comprising: a plurality of elongated spaced apart blades, means supporting said blades on the head for oscillation about its longitudinal axis within fixed limits, each blade having a cutting edge at each of its longitudinal side edges, a plurality of indexing means, an indexing means being positioned between each adjacent pair of blades, each indexing means constituting a tie between and supported by a pair of adjacent blades by having one of its ends secured to one blade and its other end secured to the other blade, and the indexing means interconnecting the blades serially for producing substantially simultaneous oscillation of all the blades upon oscillation of one blade.

2. A construction as defined in claim 1 wherein, the indexing means comprises a plurality of coil springs of predetermined tension with each spring interconnecting two adjacent blades.

3. A construction as defined in claim 1 wherein, the indexing means comprises a plurality of chains with each chain interconnecting two adjacent blades.

4. In a hydraulic dredging apparatus, a cutting head and means for supporting and selectively rotating the head in either direction, said head comprising: a plurality of elongated spaced apart blades each being supported on the head for oscillation about its longitudinal axis, each blade having a cutting edge at each of its longitudinal side edges, a plurality of pairs of stop members carried by the head, the members of each pair of stop members being positioned one on each side of each of the blades at the cutting edge sides thereof for limiting the pivotal oscillatory movement of each of the blades in each direction.

5. In a hydraulic dredging apparatus, a cutting head and means for supporting and selectively rotating the head in either direction, said head comprising: a plurality of elongated spaced apart blades each being supported on the head for oscillation about its longitudinal axis, each blade having a cutting edge at each of its longitudinal side edges, a plurality of pairs of stop members carried by the head, the members of each pair of stop members being positioned one on each side of each of the blades at the cutting edge sides thereof for limiting the pivotal oscillatory movement of each of the blades in each direction, a plurality of indexing means, an indexing means being positioned between each adjacent pair of blades, each indexing means constituting a tie between and supported by a pair of adjacent blades by having one of its ends secured to one blade and its other end secured to the other blade, and the indexing means interconnecting the blades serially for producing substantially simultaneous oscillation of all the blades upon oscillation of one blade.

6. A construction as defined in claim 5 wherein, the indexing means comprises a plurality of coil springs of predetermined tension with each spring interconnecting two adjacent blades.

7. A construction as defined in claim 5 wherein, the indexing means comprises a plurality of chains with each chain interconnecting two adjacent blades.

References Cited in the file of this patent

UNITED STATES PATENTS

| | | |
|---|---|---|
| 391,903 | Leslie | Oct. 30, 1888 |
| 1,436,015 | Cushing | Nov. 21, 1922 |
| 1,730,958 | Van Wienen | Oct. 8, 1929 |